United States Patent

Lynch et al.

[11] Patent Number: 5,971,268
[45] Date of Patent: Oct. 26, 1999

[54] I/O ASSEMBLY FOR USE WITH POINT OF SALE TERMINALS AND OTHER COMPUTING SYSTEMS

[75] Inventors: Robert Carlton Lynch, Cary; Kevin Henry Myers, Durham; Ronald Alan Smith, Apex; William Lewis Talley, Raleigh, all of N.C.; Edward Randolph Veals, Pawleys Island, S.C.

[73] Assignee: International Business Machines Corporation, Armonk, N.Y.

[21] Appl. No.: 08/944,710

[22] Filed: Oct. 6, 1997

Related U.S. Application Data

[63] Continuation of application No. 08/681,719, Jul. 29, 1996, abandoned, which is a continuation of application No. 08/448,203, May 23, 1995, Pat. No. 5,569,895, which is a continuation-in-part of application No. 08/068,323, May 27, 1993, abandoned.

[51] Int. Cl.$^6$ .............................. G07G 1/00; F16M 11/12
[52] U.S. Cl. ......................... 235/1 R; 235/7 R; 248/83.1; 248/923
[58] Field of Search ................................ 235/1 R, 7 R; 248/183, 917, 919, 921, 923; 384/275, 295, 296

[56] References Cited

U.S. PATENT DOCUMENTS

| | | | |
|---|---|---|---|
| D. 313,405 | 1/1991 | Barry et al. ........................... D14/113 |
| 4,304,385 | 12/1981 | Farouche et al. ........................ 248/410 |
| 4,437,638 | 3/1984 | Scheibenpflug .......................... 248/282 |
| 4,589,713 | 5/1986 | Pfuhl et al. ................................. 339/7 |
| 4,624,585 | 11/1986 | Nix et al. ................................. 384/296 |
| 4,687,167 | 8/1987 | Skalka et al. ............................ 248/282 |
| 4,708,312 | 11/1987 | Rohr ........................................ 248/283 |
| 4,738,422 | 4/1988 | Metheson et al. ....................... 248/183 |
| 4,750,878 | 6/1988 | Nix et al. ................................. 384/296 |
| 4,790,504 | 12/1988 | Willis et al. ............................. 248/183 |
| 4,834,329 | 5/1989 | Delapp ..................................... 248/183 |
| 4,844,387 | 7/1989 | Sorgi et al. ................................. 248/1 |
| 4,880,191 | 11/1989 | Lake, Jr. .................................. 248/371 |
| 5,024,415 | 6/1991 | Purens ..................................... 248/523 |
| 5,113,183 | 5/1992 | Mizuno et al. ..................... 340/825.31 |

*Primary Examiner*—Eddie C. Lee
*Attorney, Agent, or Firm*—Joscelyn G. Cockburn

[57] ABSTRACT

A computer Input/Output (I/O) assembly including a stand for supporting an I/O device, such as a display or the like. The stand includes a main support member and an auxiliary support member offset from the main support member. A mechanism providing swivel and rotational motions coupled the main support member to a base and another mechanism providing swivel, rotation, and tilt motions couples the auxiliary support member to the I/O device. The total rotational motion provided by the mechanisms is greater than 360°.

20 Claims, 8 Drawing Sheets ns well-known in the prior art. The prior art display
sub-assemblies usually include a support stand on which the
display is mounted. The display could be a cathode ray tube

I/O ASSEMBLY FOR USE WITH POINT OF SALE TERMINALS AND OTHER COMPUTING SYSTEMS

This is a continuation of application Ser. No. 08/681,719; filed Jul. 29, 1996, now abandoned, which is a continuation of application Ser. No. 08/448,203; filed May 23, 1995, that is now U.S. Pat. No. 5,569,895, which is a CIP of Ser. No. 08/068,323, May 27, 1993 now abandoned.

BACKGROUND OF THE INVENTION

1. Field of the Invention

The present invention relates to computing systems in general and in particular to sub-assemblies for use in said computing systems.

2. Prior Art

Display sub-assemblies for use as computer I/O devices are well-known in the prior art. The prior art display sub-assemblies usually include a support stand on which the display is mounted. The display could be a cathode ray tube (CRT) or other types of displays. Cables for transmitting power signals and/or data signals interconnect the display to the control unit of the computing assembly. Examples of prior art sub-assemblies are set forth in U.S. Pat. Nos. 4,304,385, 4,738,422, 4,880,191 and 5,024,415. The patents provide tilt, swivel and vertical motion to the displays which they support. The respective motions are necessary so that viewers can adjust the monitor to a position with which they are comfortable.

Even though the prior art devices work well for the intended purpose, they do not provide rotational motion. The need for rotational motion is particularly needed in certain environments, such as point of sale, where it is often required for the display subsystem to be mounted on different sides of the point of sale terminal or be rotated for the customer to view the screen. Even in a regular workstation or other computing environment, the rotational feature gives a user more option to adjust the monitor. The rotational feature tends to improve productivity in that the monitor has a wide range of adjustment and the user can find a position most comfortable. In addition, it may be possible to have more than one user using a single monitor.

SUMMARY OF THE INVENTION

It is therefore a main object of the present invention to provide a more efficient display subassembly than has heretofore been possible.

It is a specific object of the present invention to provide a support mechanism which rotates, swivels and tilts the display device.

It is still another specific object to provide rotation, swivel and tilt motion without tangling or otherwise damaging the cables which interconnect the I/O device to the control unit.

It is yet another object to provide a mounting structure which conceals the cables from origin to destination and therefore provides a more aesthetically pleasing terminal.

These and other objects are provided by a mounting assembly having a unified arm with a vertical section and a cantilever section. A first mechanism which provides swivel and rotational motions couple the vertical section to a base. A second mechanism which provides swivel rotation and tilt motions couple a support means for the I/O device to the cantilever section. The mechanisms enable the mounting assembly to rotate more than 360°. A conduit in the mounting assembly provides routing and conceals the power and signal cables.

DETAILED DESCRIPTION OF THE PREFERRED EMBODIMENT

Figure 1:
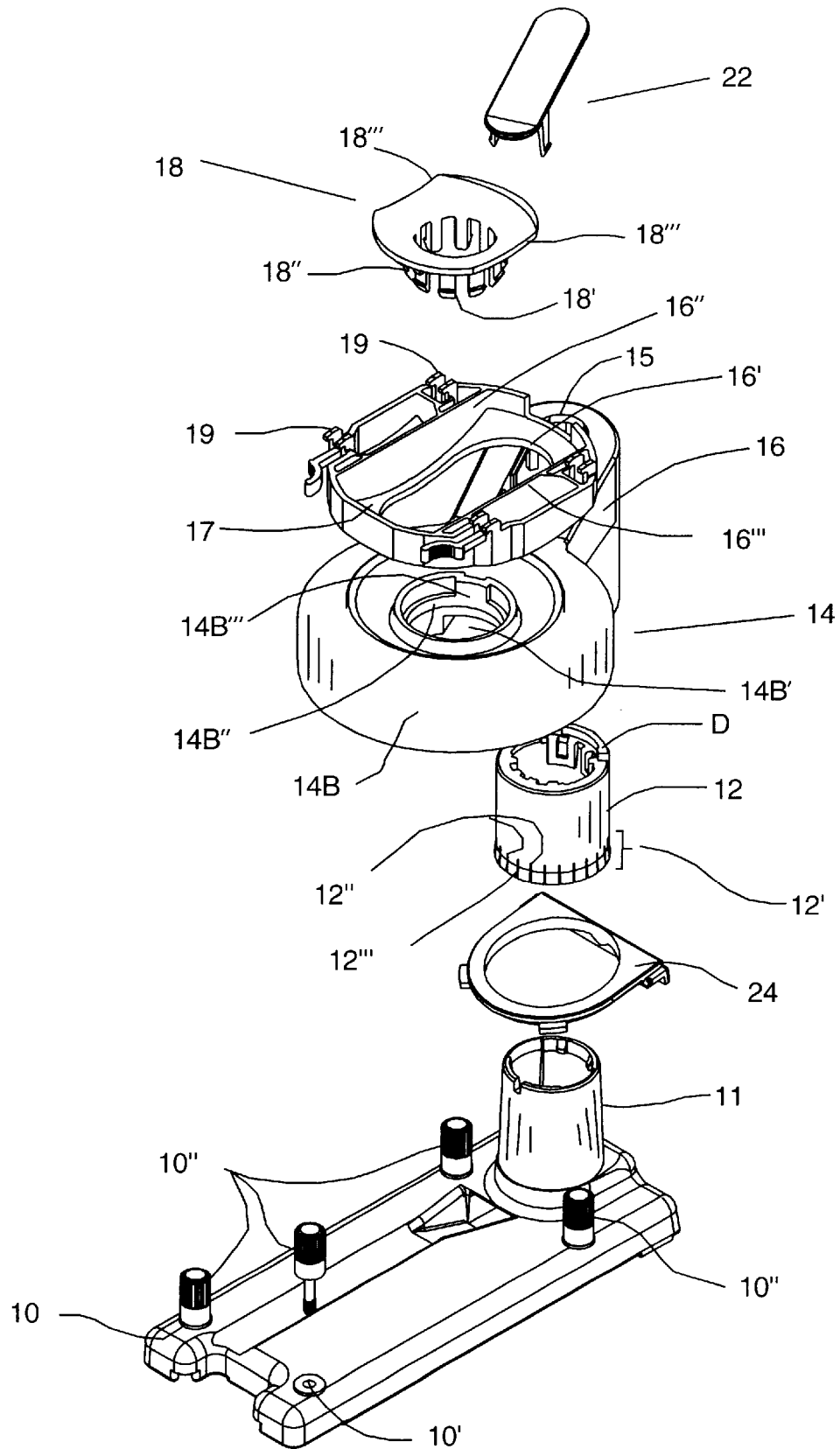
FIG. 1 shows a pictorial exploded view of the arm assembly according to the teachings of the present invention.

The same numerals are used to identify common elements in FIGS. 1–6 of the drawing. In FIG. 7, alphabetical characters are used to identify common components previously identified by numerical characters.

FIG. 1 shows an exploded view of the support arm assembly according to the teachings of the present invention. The support arm assembly includes a metallic cast base 10 with upstanding integral hollow post 12, also called support number 11 a large sleeve thrust bearing 11, device support arm 14, device support arm cover 22, tilt swivel base 16, tilt swivel retainer 18 and collar member 24.

Still referring to FIG. 1, the metallic cast base 10 is provided with a plurality of holes 10' in which fastening members 10" are used to fasten the support assembly to a flat surface. The large sleeve thrust bearing 12 is a cylindrical bearing with molded-in lubricant. The lower edge 12' of the cylindrical bearing is fitted with a plurality of slots 12''' positioned around the periphery. The slots form a plurality of fingers 12''' which extend outwardly when the bearing is press fitted over integral hollow post 11. The extended fingers co-act with the vertical section 14A (FIG. 2) of support arm 14 to hold it onto the bearing. To assemble the large sleeve thrust bearing 12, it is snapped over the top of the integral hollow post or support member 11 positioned on the cast base. The bearing supports the support arm 14 and acts as one of the pivots for the rotation of the arm. The bearing provides both thrust and radial functions. The bearing also provides the rotational and detenting limiting functions details which will be given subsequently.

The support arm 14 has a hollow vertical section 14A (FIG. 2) and a cantilever section 14B offset from the vertical section 14A. The cantilever sections 14B is non-articulate (i.e. has no joint in it.) The arm is molded from reinforced polycarbonate and supports any device such as a monitor in a cantilever fashion. The arm pivots 90° from center in either direction and is detented every 15°. The direction of pivot is determined by the left, or right location of the display monitor on the surface to which the base is attached. The rotation is always towards the outside of the surface on which the base is mounted. The rotational limit and detenting function is an integral part of the bearing at the bearing/arm interface. The cantilever section 14b of the support arm 14 is provided with an opening 14B' in which a collar 14b" and a stop 14B''' is machined. As will be explained subsequently, when the structure is assembled, the fingers 18' of tilt swivel retainer 18 rides on the undersurface of the collar 14b" to provide rotary motion to tilt swivel base 16 and the stop member 14b''' coacts with stop member 18" on one of the fingers 18' to limit the extent to which the tilt swivel base and tilt swivel retainer can rotate clockwise or counter clockwise. The free end of each of the fingers 18' is hook-shaped and coact with the undersurfaces of collar 14b" to prevent the tilt swivel retainer 18 from escaping after assembly (shown in FIG. 2).

Still referring to FIG. 1, the tilt swivel base 16 is the structure which supports the monitor 26 (FIG. 3) or other devices which the structure supports. Preferably, the tilt swivel base 16 is molded with a spherical opening 16' and upstanding side walls 16" and 16''', respectively. A ledge 17 surround the periphery of opening 16 and provides the ledge surface which cam with the undersurface of tilt swivel retainer 18 to provide tilt motion. The flat surfaces 18''' are provided on the tilt swivel retainer 18. The flat surfaces provide spacings between upstanding side walls 16" and 16''', respectively and allow the ledge surface to cam with the undersurface of tilt swivel retainer 18 in a direction substantially perpendicular to the tilt direction to provide swivel motion. A user has to adjust the tilt swivel base 16 in a desired direction in order to get the different motions. Hooks or contact members 19 are positioned on the top surface of tilt swivel base 16 and hold the monitor firmly onto the base. Of course, it is within the skill of one skilled in the art to provide other attachment mechanisms without departing from the spirit or scope of the present invention. It should be noted that this tilt and swivel base 16 coacting with swivel retainer 18, collar 146" and stop 14b''' provides tilt, swivel and rotation motion to the device mounted on it.

The tilt swivel retainer 18 captures the tilt/swivel base 16 by snapping into the previously-described openings 14B' and 16'. Both the tilt limits and the rotational limits of the tilt swivel base 16 are determined by this retainer and the length of the spherical opening 16'. The tilt limit is the length of the spherical opening 16' through which the tilt/swivel base 16 passes. The rotational limit is an integral part of the retainer at the retainer/arm interface and is provided by the stop member 18" coacting with stop 14b'''. The opening in the arm, both the cantilever section 14B and the vertical section, allows cables and other wires to the threaded to the attached monitor. The arm cover 22 fits into the opening 15 in the support arm.

Figure 2:
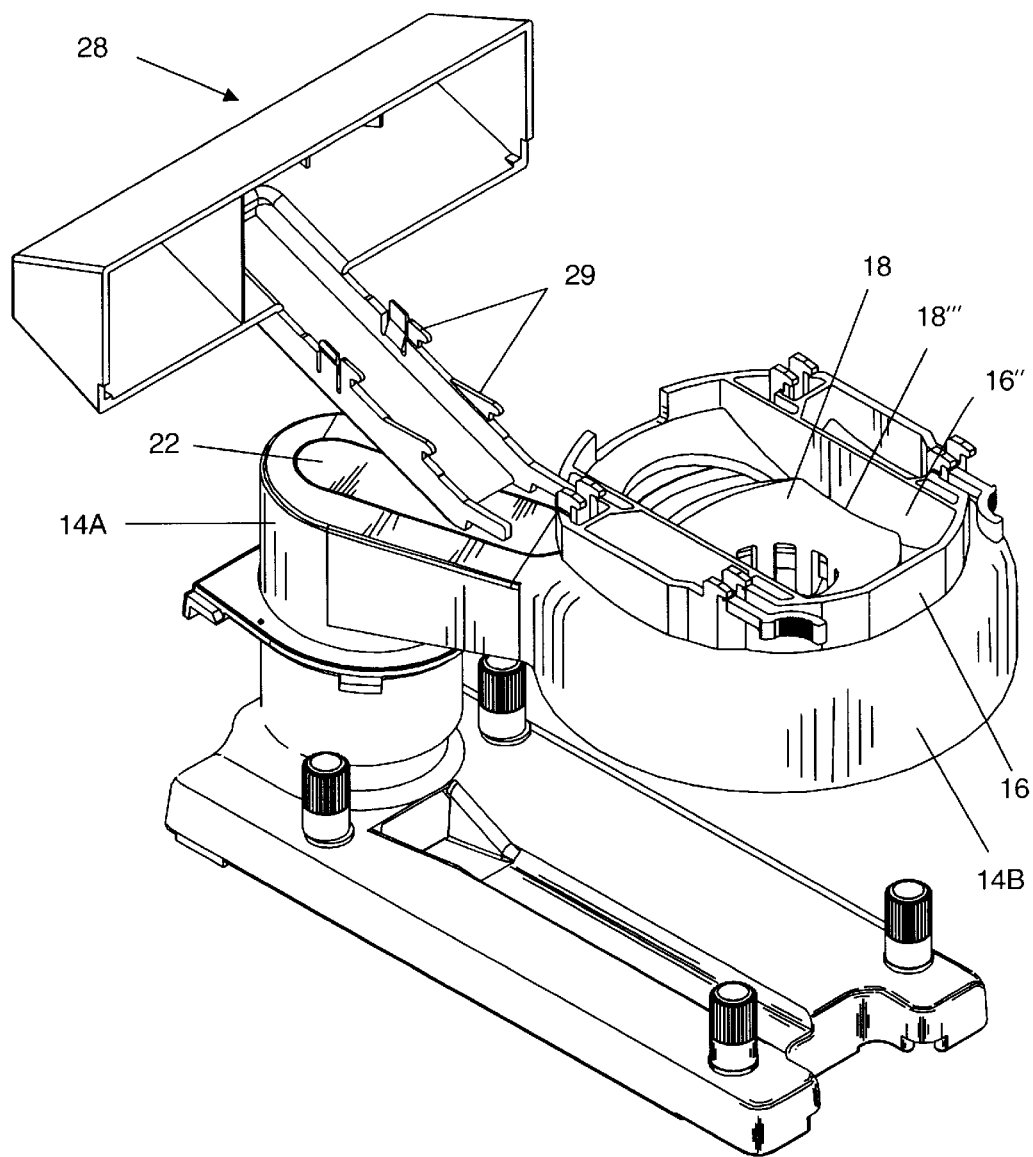
FIG. 2 shows an assembled pictorial view of the arm assembly according to the teachings of the present invention.

FIG. 2 shows the support arm 14 in its assembled form. A separate cable cover assembly 28 is fitted into an opening in the tilt swivel base 16. As will be described subsequently, the hook members 29, on the cover assembly 28, hooks into holes on the backside of the monitor. Of course, it is within the skill of the art to provide other types of attachment mechanisms without departing from the scope or spirit of the present invention. This cover assembly 28 conceals the power and signal card (to be shown subsequently) from the point of exit from the display along the underside to a point where the cables enter into tilt swivel base 16. It should be noted that flat surface 18''' does not contact sidewall 16". Instead, there is a spacing between both. Similarly, the relationship between flat surface 18''' and sidewall 16''', on the opposite side, are identical (i.e. spacing between both). Consequently, the spacing allows the tilt swivel base 16 to move, relative to the tilt swivel retainer 18, in a direction substantially perpendicular to the tilt direction to provide the swivel.

Figure 3:
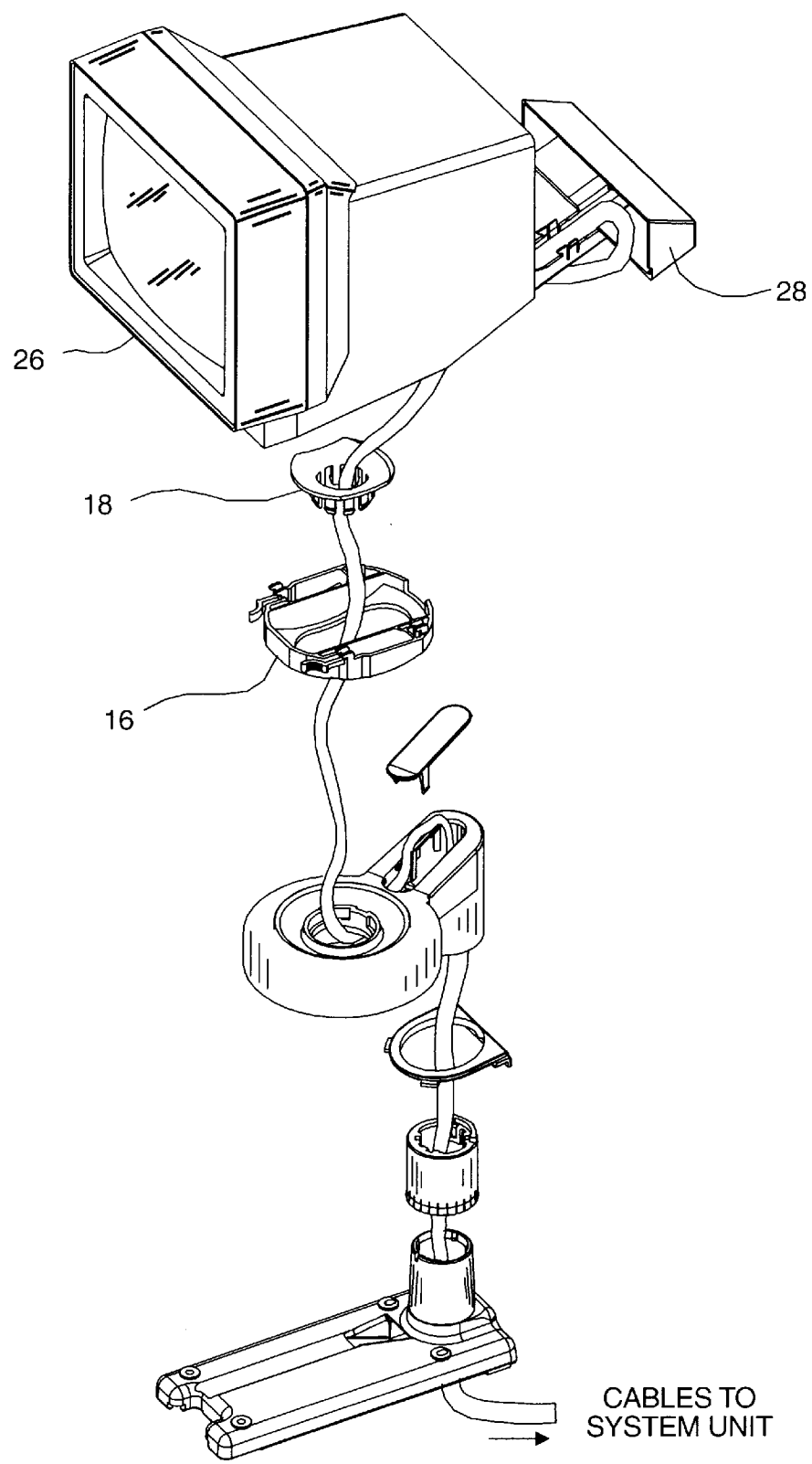
FIG. 3 shows an exploded view of the I/O subassembly of the monitor and arm assembly.

Turning now to FIG. 3, the route for interconnecting the monitor to the system unit by cables are shown. The monitor 26 is attached to the tilt swivel base 16 via the hooks on this base and slots (not shown) in the bottom of the display monitor housing 26. As stated previously, other types of devices can be used for attaching without departing from the spirit of the present invention. The total monitor rotation is greater than 400°, and is a combination of the tilt/full rotation and the monitor arm pivot capability. This rotation is achieved, regardless of whether the display monitor is mounted on the left or right side of either a system unit or a cash drawer of a point of sale system. The monitor could be mounted on the system unit, in an integral system (I/O on top of the system unit). Or the monitor can be mounted on the cash drawer in a distributed (the I/O on top of the cash drawer with the system unit located remotely) system.

Figure 4:
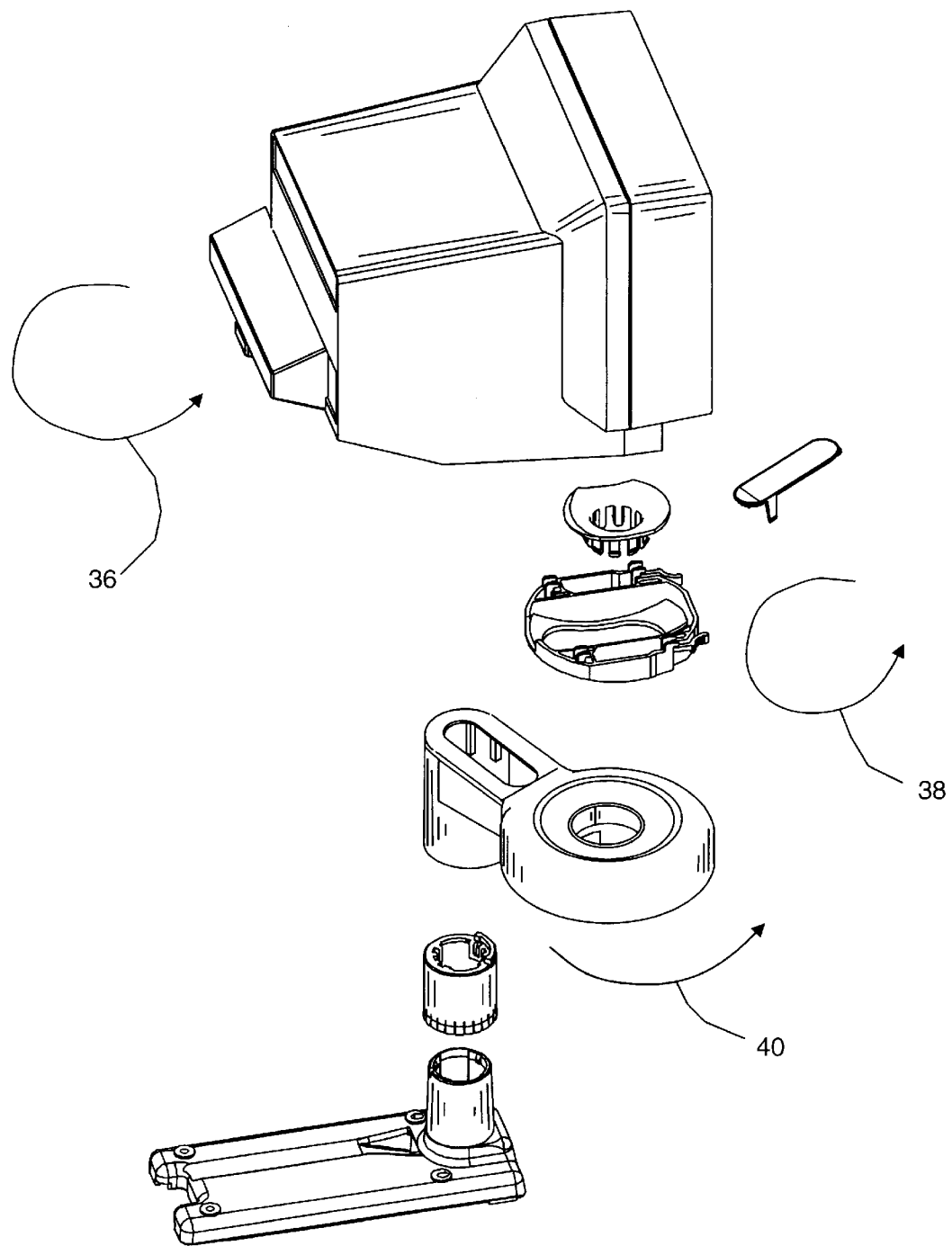
FIG. 4 shows the I/O subassembly rotated clockwise.
Figure 5:
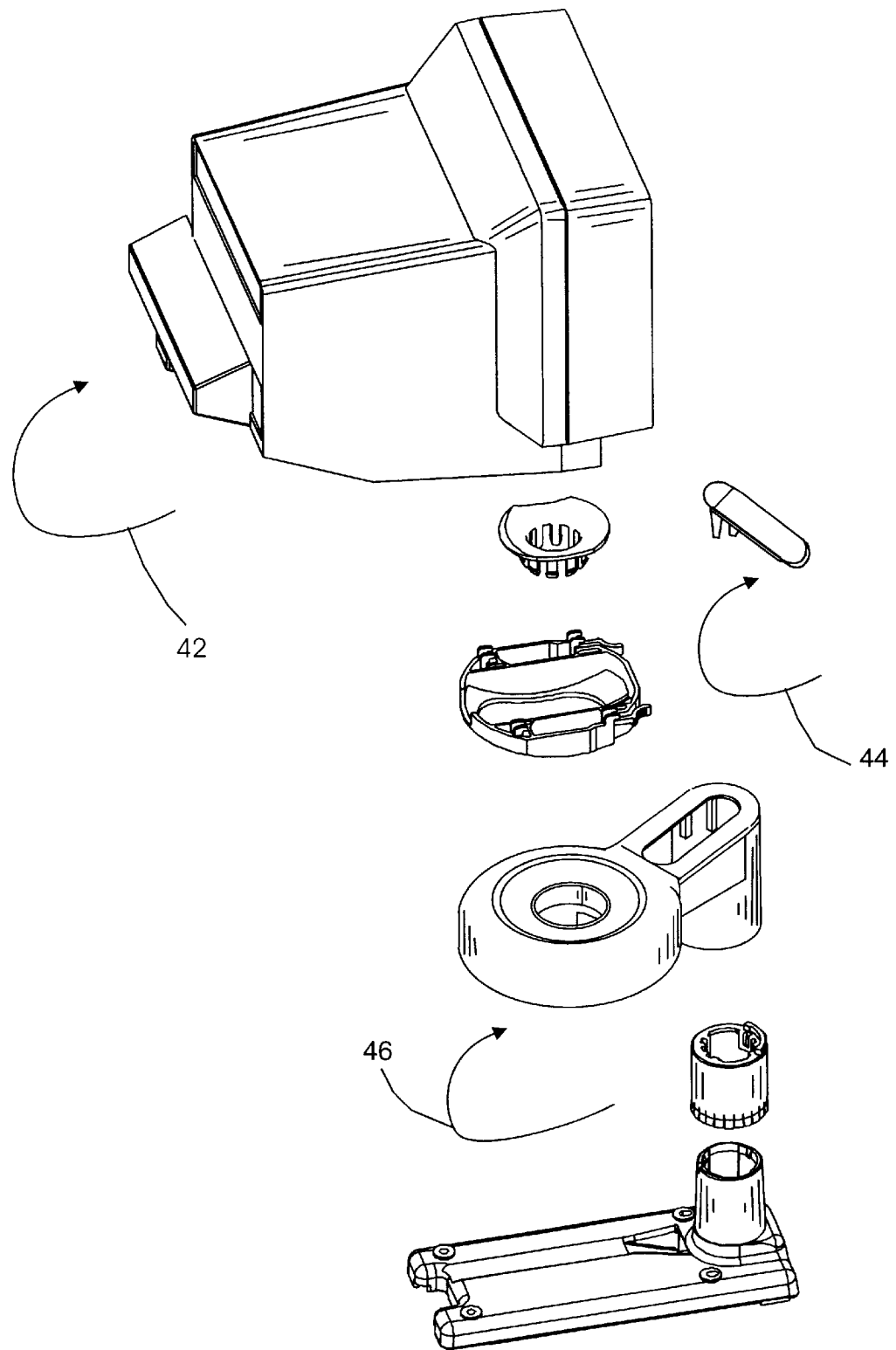
FIG. 5 shows the I/O subassembly rotated counter-clockwise.
Figure 6:
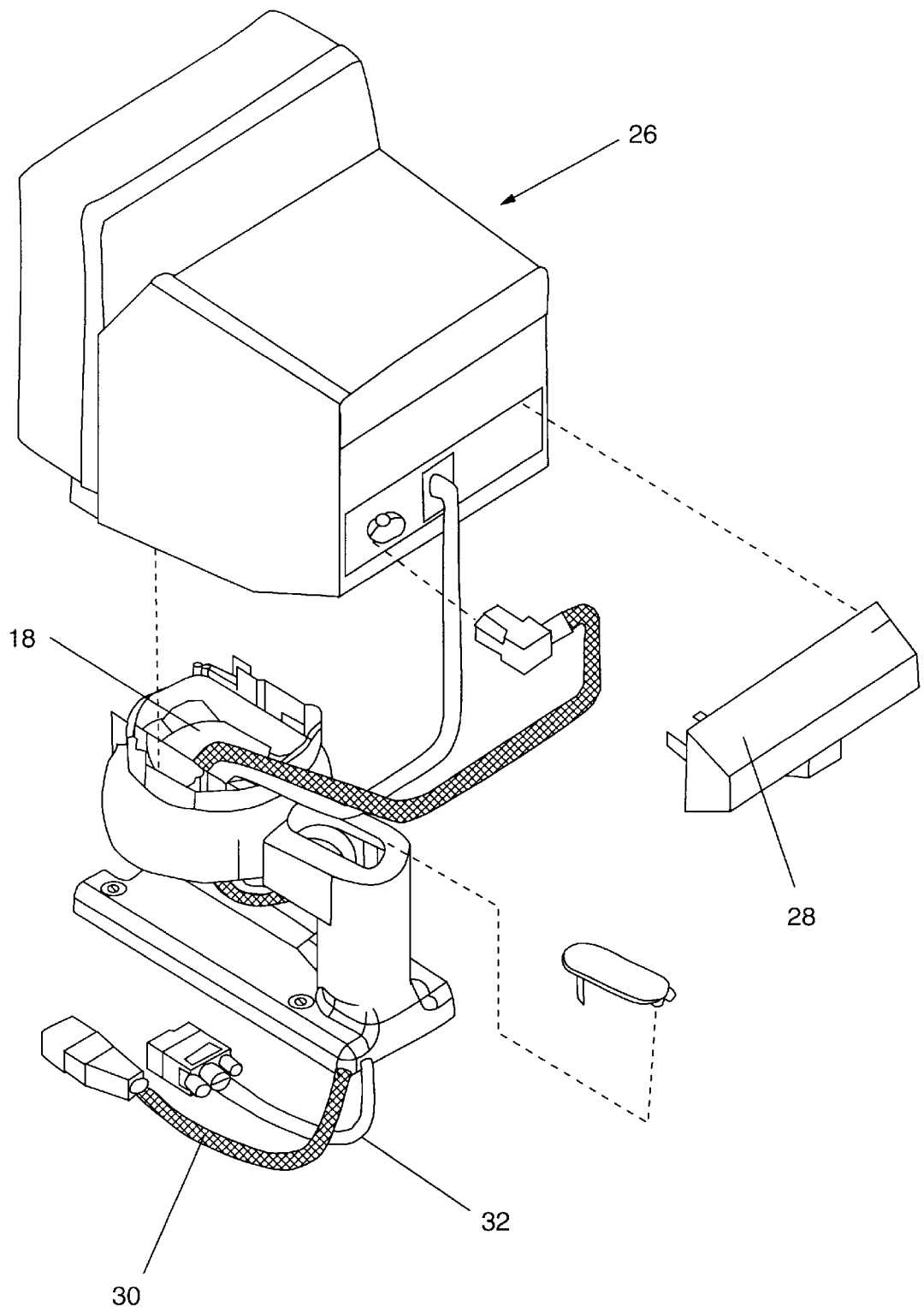
FIG. 6 shows a rear view of the I/O subassembly and rear cover.
Figure 7:
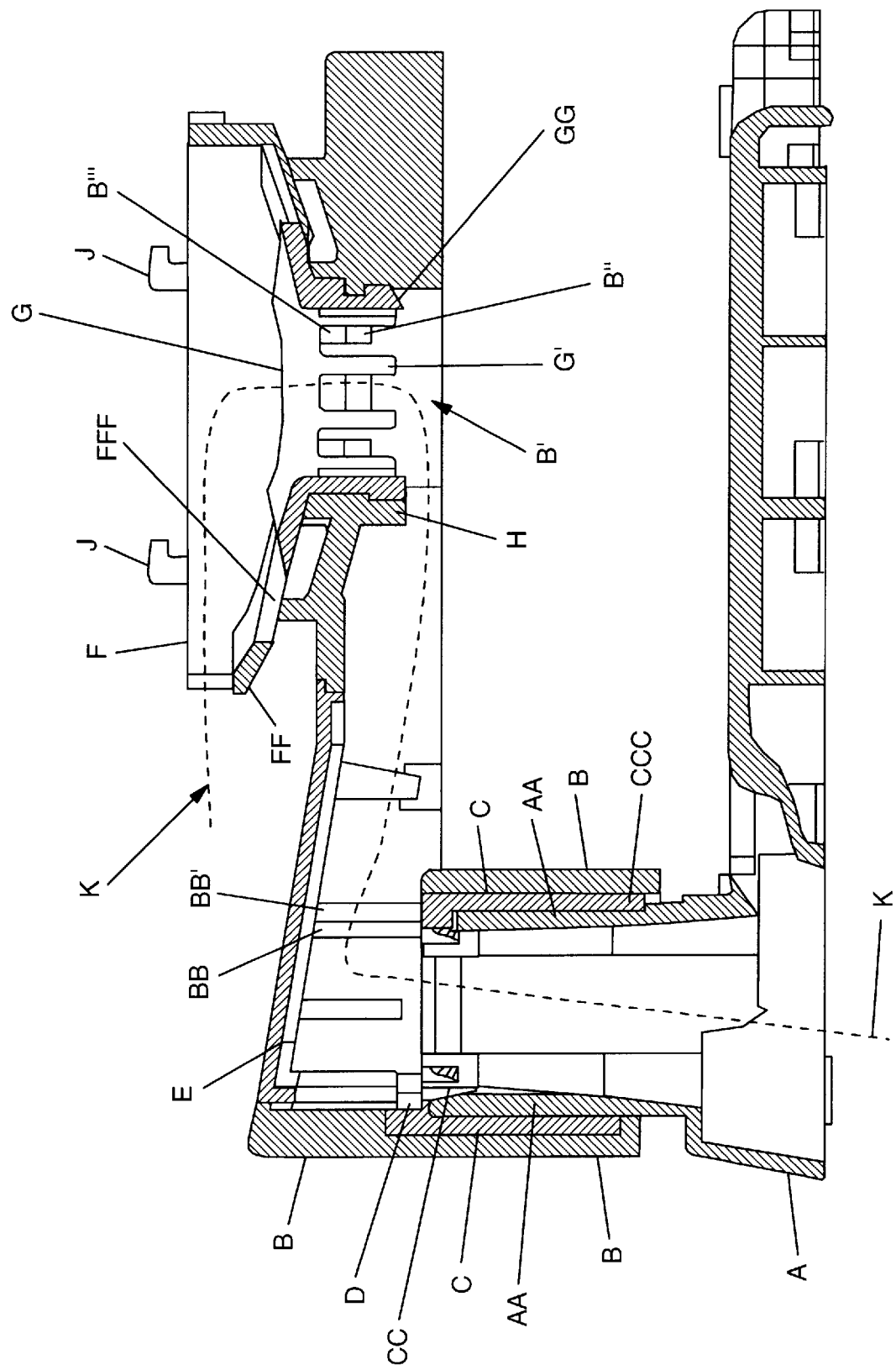
FIG. 7 shows a cross-sectional view of the arm assembly.

Referring now to FIG. 6, the power cable 30 and signal cable 32 are shown threaded through the opening provided in the arm assembly and connecting at one end to display unit 26. The power and signal cables are concealed within all of these component parts. The cables are routed from the monitor, through the hole 18 in the tilt, swivel retainer 16 back towards the pivot bearing, down through the bearing and hollow post portion of the cast base, to the control units where it is attached to the respective ports of the unit. The separate cable cover is then attached to the rear of the display monitor. This conceals the cables from their origin to their termination. This concealment provides for an unencumbered, neat overall appearance, absolute minimum cable exposure to external elements/damage, while providing a more reliable system operation because all cables and cable connections are now concealed within the system FIGS. 4 and 5 show various clockwise and counter clockwise positions in which the monitor can be rotated to provide maximum adjustment to a user. With respect to FIG. 4, the rotation is clockwise as shown by arrows 36, 38 and 40, respectively. Similarly, the rotation in FIG. 5 is in a counter clockwise direction shown by arrows 42, 44 and 46, respectively.

FIG. 7 shows a cross-sectional view of the support assembly. In this figure, alphabetical characters are used to identify the various component parts. The rigid cast metal base A is attached to rigid support surface by screws (not shown). The rigid cast metal base A has a cylindrical hollow tube section or support member AA extending upwardly from the base section. The cylindrical plastic bearing C is pressed onto the outside of hollow tube AA and is held into place with snap fingers CC which also prevent plastic bearing C from rotating on the hollow tube AA. The plastic bearing C also has molded in stop feature D which coact with B' and B' on the arm B to limit rotation of arm B to 180° (+/− 90° from center position). The cylindrical part of plastic arm B is assembled around fixed cylindrical bearing C. The lower outer rim of the bearing C has flared tabs CCC which provide retention and rotation indexing for arm B. The plastic plug E snaps in and out of arm B to ease cable routing and installation within the arm assembly.

The arm B has a spherical surface in which the spherical surface FF of device mount F rests. The spherical surfaces allow the device mount to tilt relative to the arm B. The device mount also rotates relative to arm B.

Still referring to FIG. 7, the device mount F is provided with an oval slot FFF which aligns with hole or opening B' fabricated in arm B. The device mount F is held into arm B by a first section of retainer G (also called a second section) which has a central opening with fingers G' extending downwardly into opening B' of arm B. A circular ridge B" and a traverse ridge B''' which extends upwardly from the circular ridge B″ are machined into the inside surface of the opening B′. The fingers G′ ride on circular ridge B‴ and the traverse ridge B‴ stops the circular motion of the retainer G and the trapped device mount F. The retainer G passes through monitor mount F and arm B and is held in place with retention snap fingers GG. The retainer G retains mount F to arm B and is hollow to allow cables to pass through. The retainer G rotates with device mount F and has modified snap finger H which rotates in a groove in arm B. The modified finger H and the upstanding traverse ridge B‴ limits rotation of mount F and retainer G. Stated another way, modified snap finger H is blocked by traverse ridge B‴ and, as such, the rotation of retainer G and device mount F is limited to 330° from center in either direction.

Still referring to FIG. 7, the device mount F has oval slot FFF which stops at retainer G and limits tilt to +15°, −5° from vertical. The mount F has hooks and latches J which mate with cooling slots in the CRT monitor and rigidly fix CRT monitor (or any other viewing device) to mount F. The cable path K shows routing of multiple cables through the support assembly. Cables in this path K are hidden from normal view and are protected from damage by controlling the articulation or motion of the structure at the respective articulation points of the support system.

The unique feature of the described mounting method and mounting assembly provides the maximum amount of device monitor usefulness, i.e., pivot, rotation, tilt, swivel and location positioning while concealing and protecting the cables and connections. When used in a point of sale system used in the checkout counter of most business establishments, the described mounting assembly and method provides for the display monitor to be mounted either on the right or left side of the point of sale system unit and provide all enunciated capabilities and advantages at either location.

Figure 8:
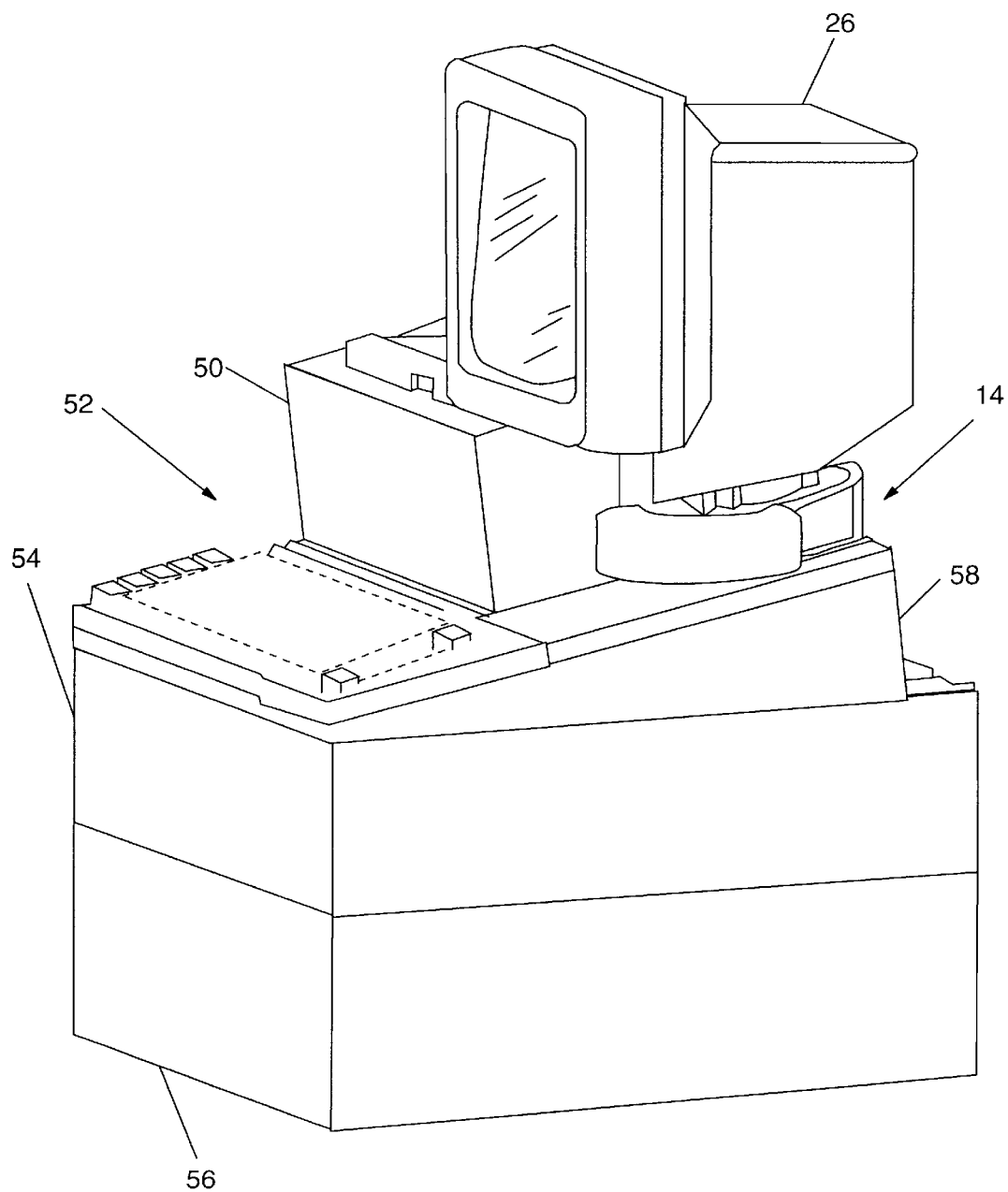
FIG. 8 shows the display sub-assembly mounted on a point of sale system.

FIG. 8 shows a pictorial view of the display sub-assembly mounted on a point of sale (POS) system. The display sub-assembly includes display 26 and display stand or support arm 14. As stated previously, the display stand is mounted on the POS terminal and supports the display which could be a cathode ray tube (CRT) or similar device. The display functions as an I/O device for the POS terminal. The POS terminal includes a printer 50, keyboard 52, control unit or computer 54 and cash drawer 56. Each of the named devices is used to perform its conventional function. Support structure 58 is mounted on the computer 54 and devices 52 and 50 are mounted on the support structure 58. FIG. 8 shows the units in a clustered configuration. An alternate configuration would be a distributed one in which the units are separated and the display sub-system is mounted on the computer 54 or cash drawer 56.

While the invention has been particularly shown and described with reference to a preferred embodiment thereof, it will be understood by those of skill in the art that modifications and variations in form and detail may be made therein without departing from the spirit and scope of the invention.

What we desire to protect by Letters Patent is.
We claim:

1. A support assembly comprising;
  a unified support arm having a vertical section and a non-articular cantilever section, with said vertical section being rigidly connected to the non-articulate cantilever section;
  a base;
  a support member connected to the base and disposed in a vertical orientation thereto;
  a device mount for supporting a device;
  a cylindrical thrust bearing, for providing rotary motion to the unified support arm, fixedly mounted to said support member; and
  means for coupling the device mount to the non-articulate cantilever section, said means rotating on the non-articulate cantilever section to permit rotary motion to the device mount and permits said device mount to tilt.

2. The support assembly of claim 1 further including a device mounted on the device mount.

3. The support assembly of claim 2 wherein the device includes a display assembly.

4. The support assembly of claim 3 further including a computer system with said support assembly being mounted on a component of the computer system.

5. The support assembly of claim 4 wherein the computer system includes a point-of-sale system having at least a control unit, cash drawer and printer arranged in a cluster configuration.

6. The support assembly of claim 5 further including a fastening means for attaching the support assembly to the point of sale system.

7. The support assembly of claim 2 further including a fastening means for fastening the base to a support surface.

8. The support assembly of claim 2 further including a conduit for receiving cables formed in components of said support assembly.

9. The support assembly of claim 8 further including at least one cable threaded through said conduit and terminating at the device.

10. The support assembly of claim 9 further including a cable cover assembly with hooks thereon for mounting to the device to conceal the at least one cable.

11. The support assembly of claim 1 wherein the unified support arm is integrally molded from reinforced polycarbonate.

12. The support assembly of claim 1 wherein the cylindrical thrust bearing includes a cylindrical plastic bearing having on one end tabs for providing retention and rotation indexing to the unified support arm mounted on said one end, and snap fingers, disposed relative to another end on the inside surface of said cylindrical plastic bearing, for coacting with the support member to prevent the bearing from rotating relative to the support arm and stop means for limiting rotation of the first structure molded on said another end.

13. The support assembly of claim 1 wherein the means including
  a first section for holding the device mount against the non-articulate cantilever section and a second section for rotatably riding on a collar fabricated on the non-articulate cantilever section.

14. The support assembly of claim 13 wherein the second section includes a plurality of spaced members with hooks fabricated on their extremities for hooking onto an undersurface of said collar.

15. The support assembly of claim 1 wherein the base and support member includes a metallic casting with a relatively flat section and integral upstanding hollow section.

16. The support assembly of claim 1 further including a display unit mounted on said device mount.

17. A point of sale system comprising:
  a cash drawer,
  a control unit operatively mounted to the cash drawer;
  a support structure mounted to the control unit;
  a keyboard coupled to the support structure;

and an assembly mounted to the support structure; said assembly including a base connected to the support structure, a support member connected to the base and disposed in a vertical orientation thereto, a cylindrical thrust bearing fixedly mounted to said support member, a unified support arm having a vertical section and a non-articular cantilever section, with said vertical section being rigidly connected to the non-articulate cantilever section and mounted on the cylindrical thrust bearing, a device mount for supporting a device, and a retainer operatively coupling the device mount to the non-articulate cantilever section wherein rotary motion is permitted to the device mount by fingers extending from the retainer which ride on a ledge fabricated on one surface of the non-articulate cantilever section, and a tilt motion is permitted to said device mount when said device mount is moved on another surface of the non-articulate cantilever section and the retainer.

18. The support assembly of claim 17 wherein the retainer includes a body section with a first surface thereon which cams against a surface on the device mount to permit the tilt motion and a plurality of snap fingers integral with the body section and extending downwardly with each snap finger having a surface camming on said one surface of the non-articulate cantilever section to provide the rotary motion.

19. A support assembly comprising;

a unified support arm having a vertical section and a non-articulate cantilever section, with said vertical section being rigidly connected to the non-articulate cantilever section and said non-articulate cantilever section including an opening with a ledge fabricated therein;

a base;

a member connected to the base and disposed in a vertical orientation thereto;

a device mount for supporting a device;

a cylindrical thrust bearing, for providing rotary motion to the unified support arm, fixedly mounted to said member; and a retainer, including extended fingers riding on said ledge, coupling the device mount to the non-articulate cantilever section, said retainer coacting with the non-articulate cantilever section to permit rotary motion and tilt motion to the device mount.

20. The support assembly of claim 19 further including first means provided on the vertical section of the unified support arm and the cylindrical trust bearing for limiting rotation of said unified support arm to 180° (+/− 90° from center position); and second means provided on the non-articulate cantilever section and the retainer to limit the at least rotary motion of said device mount to less than 360°.

* * * * *